(12) United States Patent  (10) Patent No.: US 7,743,984 B2
Olsen et al.  (45) Date of Patent: Jun. 29, 2010

(54) SYSTEMS AND METHODS FOR TRACKING ITEMS USING WIRELESSLY-ENABLED DEVICES

(75) Inventors: John A. Olsen, Cumming, GA (US); David Lewis Bradley, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1175 days.

(21) Appl. No.: 11/262,337

(22) Filed: Oct. 28, 2005

(65) Prior Publication Data

US 2006/0091206 A1  May 4, 2006

Related U.S. Application Data

(60) Provisional application No. 60/623,583, filed on Oct. 29, 2004.

(51) Int. Cl.
*G06B 15/02* (2006.01)

(52) U.S. Cl. .................. 235/384; 235/385; 235/494; 235/380; 340/539.13; 340/573.1; 340/825.49

(58) Field of Classification Search ................ 235/384, 235/385, 494, 380; 340/539.13, 573.1, 825.49
See application file for complete search history.

(56) References Cited

U.S. PATENT DOCUMENTS

| | | | |
|---|---|---|---|
| 5,043,908 A | | 8/1991 | Manduley et al. |
| 5,822,714 A | * | 10/1998 | Cato .................... 702/108 |
| 5,835,377 A | | 11/1998 | Bush |
| 6,211,781 B1 | | 4/2001 | McDonald |
| 6,433,732 B1 | | 8/2002 | Dutta et al. |
| 6,700,493 B1 | | 3/2004 | Rosinson |
| 2003/0132854 A1 | | 7/2003 | Swan et al. |
| 2004/0124977 A1 | | 7/2004 | Biffar |
| 2005/0103838 A1 | * | 5/2005 | Slotkin et al. .............. 235/380 |
| 2007/0103292 A1 | * | 5/2007 | Burkley et al. .......... 340/539.13 |
| 2008/0018434 A1 | * | 1/2008 | Carrender et al. ........ 340/10.31 |
| 2008/0087730 A1 | * | 4/2008 | Howarth et al. ............. 235/435 |

FOREIGN PATENT DOCUMENTS

EP    1 189 163 A2    3/2002

OTHER PUBLICATIONS

International Search Report from corresponding International Application No. PCT/US05/039036 dated Feb. 10, 2006.

* cited by examiner

*Primary Examiner*—Allyson N Trail
(74) *Attorney, Agent, or Firm*—Alston & Bird LLP

(57) ABSTRACT

The present invention is generally directed to a tracking and visibility system of a kind that augments aspects of traditional tracking systems by implementing mechanisms for independently detecting and verifying the whereabouts of particular objects moving through a carrier's logistics network. These mechanisms are preferably implemented without having to alter the outward appearance or manner in which such objects would otherwise be shipped. At a high level, the present invention accomplishes this by providing a comprehensive tracking system that includes at least two levels of tracking, one of which involves physically associating a wireless device with an object to be tracked, the wireless device being configured to transmit a signal that can be used to independently detect and verify the location of the particular object as it moves through the carrier's logistics network.

13 Claims, 6 Drawing Sheets

SYSTEMS AND METHODS FOR TRACKING ITEMS USING WIRELESSLY-ENABLED DEVICES

CROSS-REFERENCE TO RELATED APPLICATIONS

This application claims the benefit and priority of U.S. Provisional Application No. 60/623,583, filed Oct. 29, 2004, which is hereby incorporated herein in its entirety by reference.

FIELD OF THE INVENTION

The present invention relates generally to tracking and visibility systems and methods, and, more particularly, to systems that incorporate the use of wirelessly-enabled devices for tracking and monitoring the movement of particular items.

BACKGROUND OF THE INVENTION

The tracking of high value assets is an ongoing business problem for many companies. In particular, the tremendous volume of goods flowing through a transportation system on any given day creates a significant logistical challenge. As a result, tracking and visibility systems play an integral part in most transportation systems by allowing both customers and transportation personnel to track the flow of goods. However, despite the existence of many prior art systems, items flowing through a transportation system are, on occasion, still delivered to a location later than expected, misdelivered to an incorrect address, and even lost or stolen somewhere along the way. These and other such mishaps can be particularly troubling when the items being shipped are considered "high-value" items, based on either their relative importance to the shipper or on their raw economic value. Examples of high-value items can include shipments of diamonds, expensive jewelry, computer chips, cars or sensitive documents, to name just a few.

For the most part, item tracking services known in the art are passive in the sense that they are generally not designed to actively address the types of problems discussed above. In other words, most solutions in the past have been inhibited by their lack of active scanning and reporting of location for each particular item moving through the transportation network. This is due in part to the fact that many items are bundled or aggregated together with other items for efficiency of shipment. As a result, many items are not physically (i.e., actually) scanned at every transportation point, which they pass through. Instead, a "logical" scan of the item is performed, meaning that if the bundled or aggregated load arrives at (or departs from) a particular location, the bundled load is scanned and the tracking data for each particular item assumed to be within that bundle is updated accordingly. This occurs despite the fact that each particular item believed to be in the bundle may not actually be present.

Thus, for example, if an item is lost, stolen, behind schedule, or misdelivered to an incorrect address, such problems may go undetected until a shipper or consignee notices the problem and calls to report it. By then, however, a substantial amount of time may have been passed, during which transportation and security personnel could have been looking into the problem. As such, the likelihood of being able to diagnose and remedy the cause of any potential problems may have been reduced.

Furthermore, while it is sometimes possible to ship an item via special shipping channels that incorporate more stringent security measures, doing so may not always be desirable. Aside from the fact that shipping an item in such a way can be substantially more expensive, the added security measures can, in some cases, create a new set of problems by drawing unnecessary attention to the item. In other words, by shipping the item via special shipping channels, the shipper may in effect be identifying the item to would-be criminals as a high value item. Thus, in some cases it may actually be safer to at least provide the appearance that the item is being shipped via "standard" means so that the item blends in and, as such, does not stand out as an item of particular value in the various shipping yards, hub locations and other transport points through which the item is likely to pass.

Therefore, an unsatisfied need exists in the industry for improved tracking and visibility systems and methods that overcome the deficiencies in the prior art, some of which are discussed above.

BRIEF SUMMARY OF THE INVENTION

The present invention seeks to provide a tracking and visibility system of a kind that augments aspects of traditional tracking systems by implementing mechanisms for independently detecting and verifying the whereabouts of particular objects moving through a carrier's logistics network. These mechanisms are preferably implemented without having to alter the outward appearance or manner in which such objects would otherwise be shipped. At a high level, the present invention accomplishes this by providing a comprehensive tracking system that includes at least two levels of tracking, one of which involves physically associating a wireless device with an object to be tracked, the wireless device being configured to transmit a signal that can be used to independently detect and verify the location of the particular object as it moves through the carrier's logistics network.

In one embodiment, a system is disclosed for monitoring an object moving through a carrier's logistics network having a plurality of scan points, the object associated with a tracking number for facilitating tracking of the object through the logistics network, the system comprising: a plurality of scanning devices for generating first tracking data by scanning a label associated with the object at each of a plurality of scan points within the logistics network; a wireless device physically associated with the object, the wireless device configured to transmit a signal comprising a device identifier for uniquely identifying the device; and a plurality of wireless access points for receiving the signal from the wireless device and generating second tracking data identifying a location of the wireless device and the physically associated object at a time the signal is received, the second tracking data based at least in part on the location of each the wireless access point receiving the signal.

The system according to this embodiment further includes a database for storing data associated with the movement of the object through the logistics network; and a central processing unit in communication with the plurality of scanning devices, the plurality of wireless access points, and the database, the central processing unit configured to: receive the first tracking data from the plurality of scanning devices; receive the second tracking data from the plurality of wireless access points; and store the first tracking data and the second tracking data in the database in association with at least one of the device identifier and the tracking number, whereby the first and second tracking data combine to provide an enhanced level of monitoring of the object by providing at least two independent mechanisms for verifying the whereabouts of the object within the logistics network.

In another embodiment, a method is disclosed for monitoring an object moving through a carrier's logistics network having a plurality of scan points, the object associated with a tracking number for facilitating tracking of the object through the logistics network, the method comprising the steps of: physically associating a wireless device with the object, the wireless device configured to transmit a signal comprising a device identifier for uniquely identifying the device; associating the device identifier with the tracking number; generating first tracking data by scanning a label associated with the object at each of a plurality of scan points within the logistics network; receiving the signal from the wireless device at at least one of a plurality of wireless access points positioned throughout the logistics network; generating second tracking data based at least in part on the location of each the wireless access point receiving the signal, the second tracking data identifying a location of the wireless device and the physically associated object at a time the signal is received; and storing the first tracking data and the second tracking data in a database in association with at least one of the device identifier and the tracking number, whereby the first and second tracking data combine to provide an enhanced level of monitoring of the object by providing at least two independent mechanisms for verifying the whereabouts of the object within the logistics network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
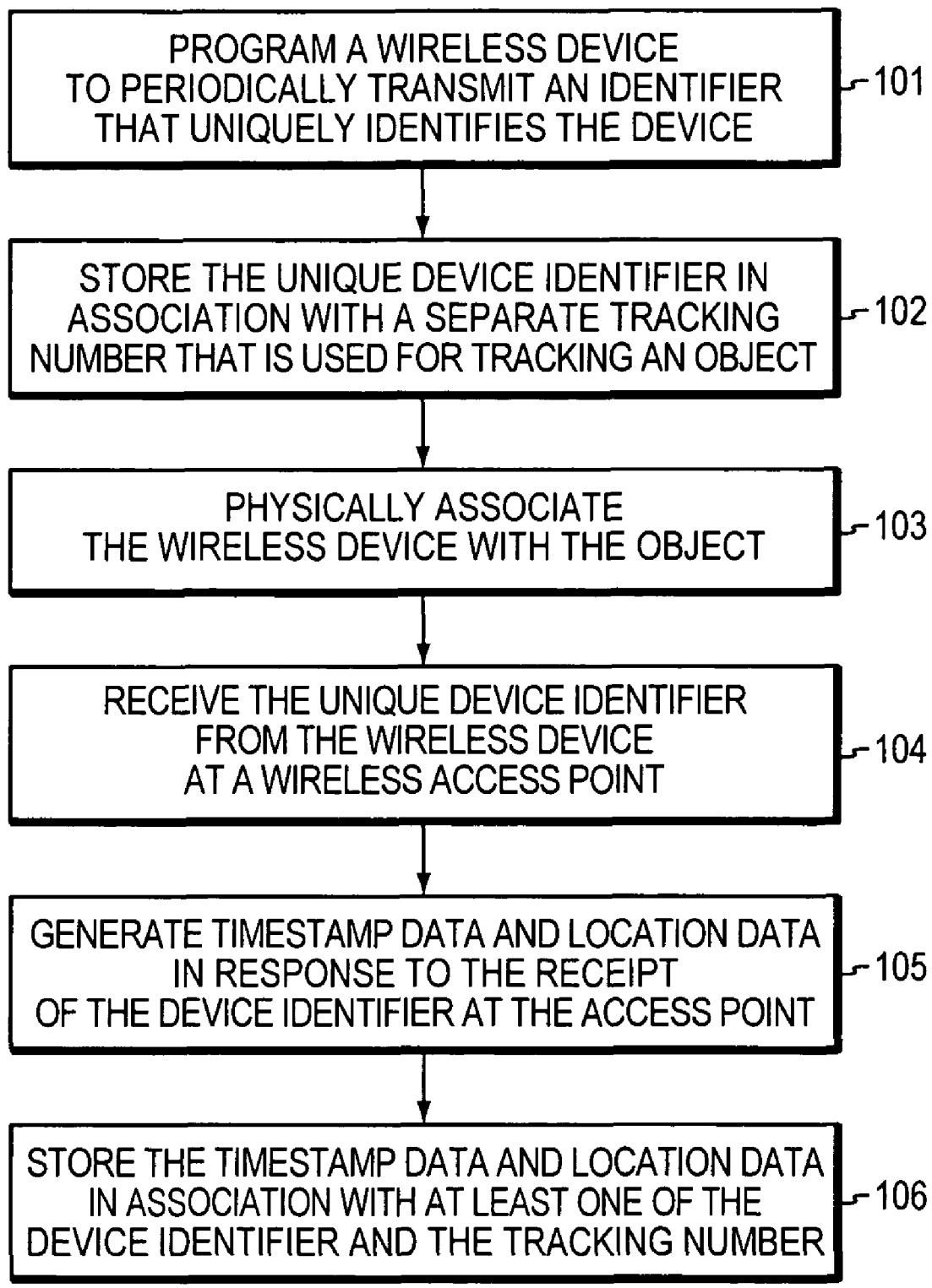
Figure 6:
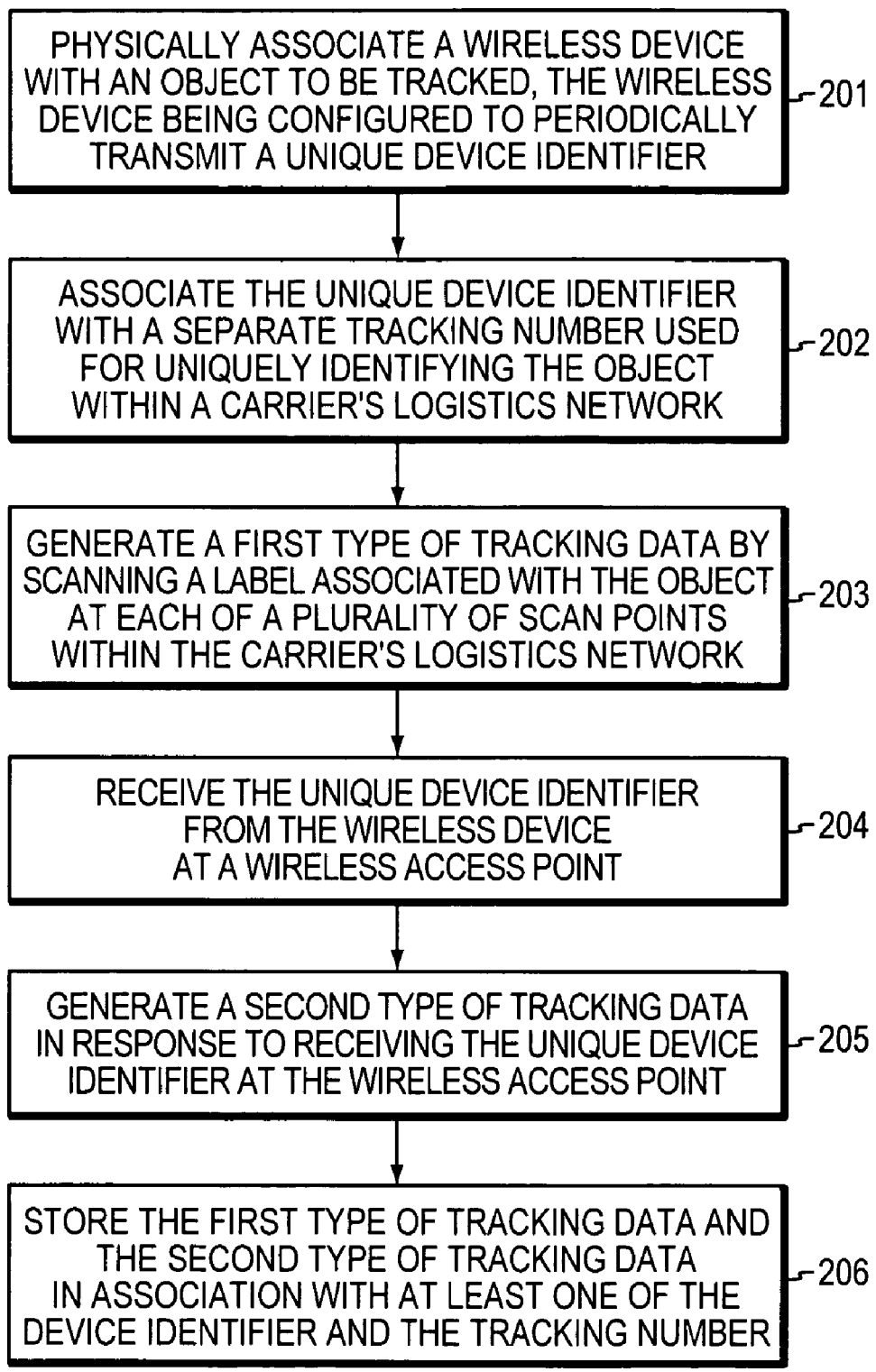

FIG. 5 shows a process flow diagram that illustrates the steps for using a wirelessly-enabled device to facilitate the tracking of an item in accordance with an embodiment of the present invention; and FIG. 6 shows a process flow diagram that illustrates the steps for using a wirelessly-enabled device to facilitate the tracking of an item in accordance with another embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Generally described, the present invention is directed to tracking and visibility systems and methods that can be used to augment aspects of traditional systems by implementing mechanisms for independently detecting and verifying the whereabouts of particular objects moving through a carrier's logistics network. These mechanisms are preferably implemented without having to alter the outward appearance or manner in which such objects would otherwise be shipped. At a high level, the present invention accomplishes this by providing a comprehensive tracking system that includes at least two levels of tracking, one of which involves physically associating a wirelessly-enabled device (wireless device) with an object to be tracked, the wireless device being configured to transmit a signal that can be used to independently detect and verify the location of the particular object as it moves through the carrier's logistics network.

According to one embodiment, a wirelessly-enabled device 18 (wireless device) can be inserted into, or otherwise physically associated with, a particular object or item 14 for identification purposes. This may include, for example, placing a wireless device 18 inside a high-value package 14 that is to be shipped via a common carrier, such as UPS™. The wireless device can be programmed to "wake up" at predetermined intervals and broadcast a signal that identifies the device's presence to any nearby wireless access points 22. If there is a wireless access point 22 within range of the device 18 at such time, the transmission or message from the device can be received and correlated with timestamp and location data to track the object's movement.

The signal transmitted by the wireless device 18 typically includes, but is not limited to, a device identifier 20 that can be used to uniquely identify the particular device, and thus the object 14 that it is associated with. In one embodiment, the device identifier 20 can be associated with a separate tracking number that is of a type typically used by common carriers (e.g., UPS™) to track objects moving through their system. Thus, by having previously associated the device identifier 20 with the object's tracking number, receipt of the device identifier 20 at an access point 22 can be used to verify that the object 14 was physically present at a location proximate the access point during a time when the signal was received. Furthermore, by integrating this independently obtained tracking information with other types of tracking data generated by the carrier (e.g., scanning operations that occur at various pickup and drop-off locations), the present invention provides a comprehensive tracking and visibility system that can be used to verify the location (or at least the last known location) of a particular object moving through the carrier's logistics network.

Figure 1:
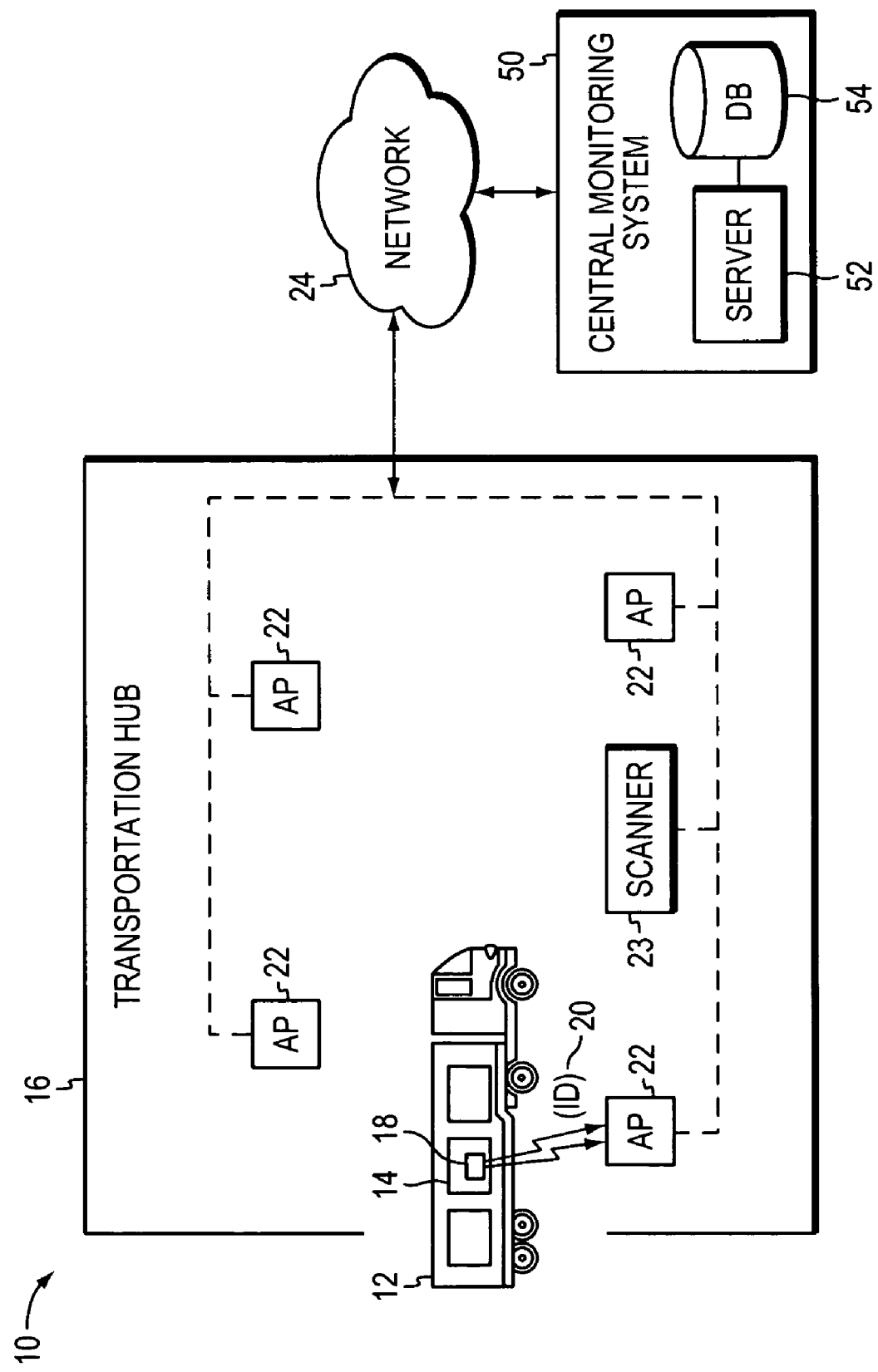
FIG. 1 illustrates a wirelessly-enabled tracking and visibility system in accordance with an embodiment of the present invention.

FIG. 1 illustrates a wirelessly-enabled tracking and visibility system 10 in accordance with one embodiment of the present invention. In this illustrative embodiment, a tractor-trailer 12 carrying an object 14 is shown entering a transportation hub 16. Physically associated with the particular object 14 is a wireless device 18, which is configured to periodically transmit a unique device identifier 20 at predetermined intervals. The wireless device 18 can be any type of wireless device that is capable of transmitting a unique device identifier 20 to a nearby wireless access point 22. This may include, but is not limited to, a Bluetooth-enabled device, a WiFi-enabled device, and/or a WiMAX-enabled device, which is preferably associated with the object 14 in a discrete or stealthy manner. In one embodiment, the device identifier 20 can be the unique media access control (MAC) address associated with the device 18. As would be understood by one of ordinary skill in the art, most wireless devices of the type listed above each include a media access control (MAC) address (or the equivalent) that uniquely identifies that device to any wireless access point 22 that are within range of the device.

Each transmission of the device identifier 20 by the wireless device 18 can be detected by any wireless access point 22 that is within range of the device and configured to listen for it. As shown, the transportation hub 16 may include a plurality of wireless access points (AP) 22 positioned in such a way as to provide complete or optimal coverage over a desired area defined in relation to the hub. Receipt of the unique device identifier 20 at any one of the wireless access points 22 can be used to trigger a sequence of tracking and visibility steps that are performed in relation to the object 14. In one embodiment, the tracking information generated at the wireless access point(s) 22, in response to having received a transmission from the wireless device 18, can be transmitted to a central monitoring system 50 via a wireless or wireline network 24. The central monitoring system 50 generally includes a server 52 and one or more databases 54 for maintaining and processing tracking and other shipping related data associated with the object 14.

The wireless access point 22, and any related systems in communication therewith, can be configured to generate or receive timestamp and location data upon receipt of the unique device identifier 20 from the wireless device 18. In one embodiment, the timestamp data may be included in the signal transmitted by the wireless device 18. By detecting the occurrence of such transmissions from the device 18, a time and date during which the device (and thus the object 14) is physically within transmission range of a particular access point 22 can be recorded in association with the unique device identifier 20. In one embodiment, the location of the object 14 can be determined based in part on the fact that the wireless access point 22 receiving the signal is at a fixed location. A fixed wireless access point 22 may include, for example, an antenna mounted on a building or tower at the transportation hub 16, the precise location of which is either known or made known to the system 10. In other embodiments, as will be described below, additional means (e.g., GPS data) can be used to determine the approximate location of the object 14 at a time when the device identifier 20 is received by a particular wireless access point 22.

Objects moving through a transportation system are typically tracked by scanning a label (e.g., barcode, RFID tag, etc.) associated with the object at one or more scan points throughout the carrier's logistics network. For example, at the transportation hub 16, one or more scanning devices 23 may be used to scan a label associated with the object 14 so as to generate tracking data revealing the presence of the object 14 at the transportation hub. Such scanning operations may occur upon arrival, during a sortation process, and/or before departure from the transportation hub 16, for example. However, some of these scanning operations may not actually involve a "physical" scan of the object 14, meaning the scanning operation may not actually be performed on a label affixed directly to the object. Numerous objects destined for a common delivery point within a logistics network are often bundled together in a single larger container for efficiency of transport. As a result, many individual objects (e.g., packages) are not "physically" scanned at every transportation point through which they pass. Instead, a label on the larger container may be scanned and, by association, the tracking data for each of the individual objects believed to be within is updated accordingly. This is sometimes referred to as a "logical" scan since physical verification of each of the individual objects does not occur at such point. Rather, the tracking data for each of the individual objects is updated based on the assumption they are within the container, and these updates occur despite the fact that one or more of such objects may not actually be there.

Thus, because a physical (i.e., actual) scan of the object 14 may go unperformed during numerous stages of transport, objects sometimes turn up lost or stolen without the benefit of having much insight into where things might have gone wrong. One advantage of the present invention is that it specifically detects and verifies the presence of a particular object 14 at a location where one or more wireless access points 22 are provided. In other words, by having the wirelessly-enabled device 18 automatically announce its presence to any nearby wireless access points 22, as illustrated in FIG. 1, the system 10 knows that the particular object 14 has in fact arrived at (or is still present at) a location proximate that access point. Because this verification occurs regardless of whether or not the particular object 14 undergoes a physical scan at such location, the present invention eliminates much of the uncertainty that might otherwise be associated with the practice of relying on "logical" scans.

This heightened level of monitoring and visibility into the movement and whereabouts of a particular object 14 can be especially useful in tracking high-value items, though it in no way is limited to the use thereof. Furthermore, these enhanced monitoring capabilities can be achieved without having to identify or designate the object 14 for any sort of special handling, which can sometimes have the unintended effect of alerting would-be criminals to the fact that the object is a high-value item. Instead, the object 14 can be shipped via standard shipping channels without giving any such indication of its value (i.e., by concealing the wireless device 18 within the object 14, for example), while at the same time be afforded a much more stringent level of monitoring services. Such monitoring services can in effect be going on behind the scenes relative to the normal tracking and routing of the object as it moves through the carrier's logistics network.

In the context of a package delivery system, the unique device identifier 20 can be associated with a package 14's standard tracking number, which may be of a type that would normally be provided by a common carrier such as UPS™, for example. In one embodiment, the association between the device identifier 20 and the tracking number can be carried out by using a scanning device to scan a first barcode found on a standard shipping label associated with the object or package 14 and to scan a second barcode found on the wireless device 18, the first barcode having been previously encoded with the tracking number and the second with the device identifier. This information can then be fed into an online shipping system, such as UPS.com, for example, which handles the logistics of storing the unique device identifier 20 in association with the object 14's standard tracking number in an appropriate database 54. The process by which this information is associated can be carried out by either a customer or the carrier at a time when the package 14 is being prepared for shipment. In one embodiment, this process is preferably performed prior to sealing up the package 14 so that the wireless device 18 can be placed somewhere inside the package so as to conceal it from view.

The association or linkage between the package 14's standard tracking number and the unique device identifier 20 provides a particularly robust tracking and visibility system that allows different sources of tracking data to be combined for the same object. In other words, by combining standard tracking data that would otherwise be associated with the package 14 via its tracking number with the additional tracking data that is generated by use of the wirelessly-enabled device 18, a customer and the carrier can be provided with a particularly detailed and independently verified summary of where the package 14 has been, and when. In some cases, this data may also be used by the carrier to identify and analyze what appear to be unwanted reoccurring problems that are particular to certain segments of a transportation network.

Figure 2:
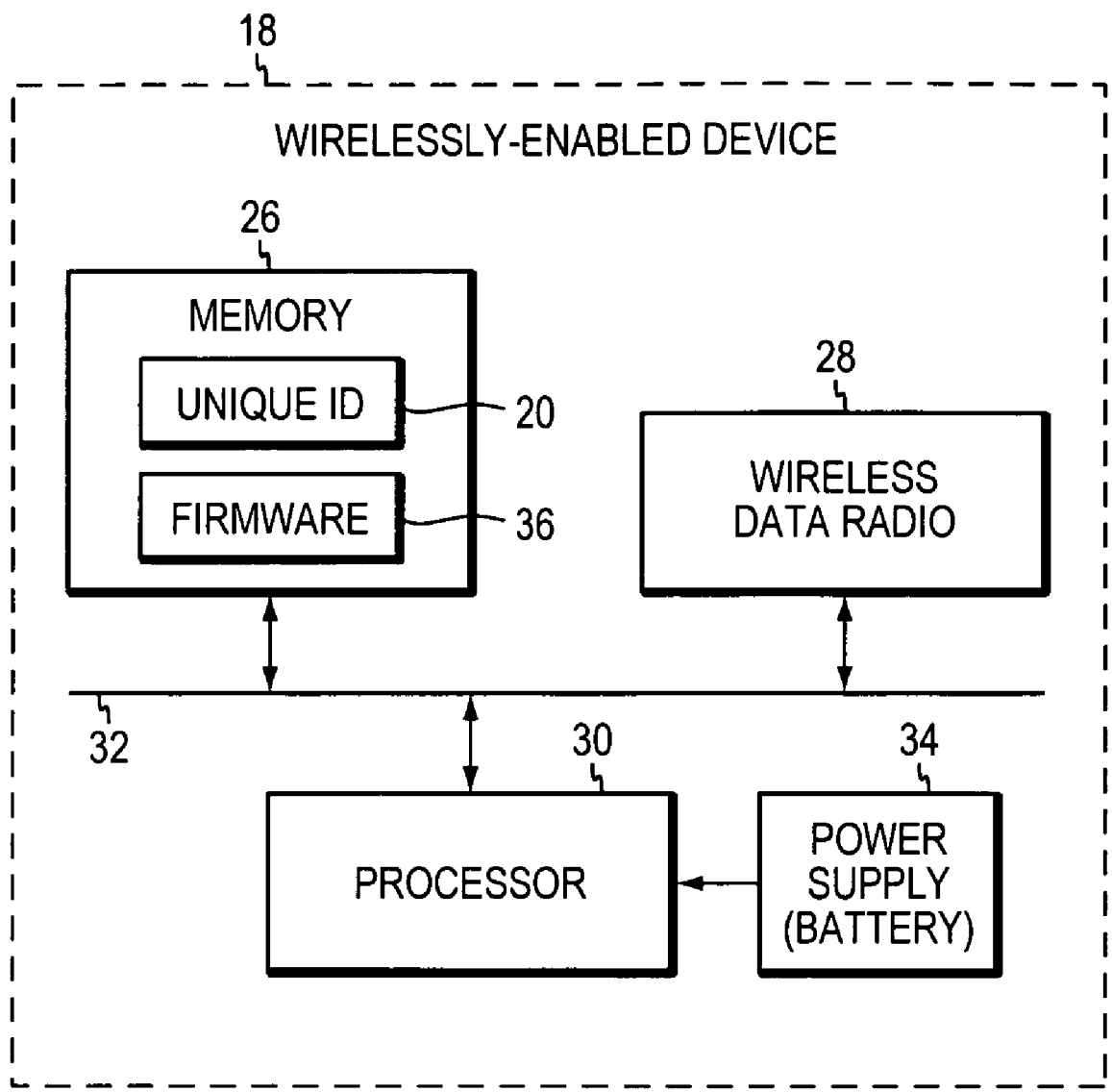
FIG. 2 shows a high level block diagram of an exemplary wirelessly-enabled device of a type that can be used to facilitate tracking of an item in accordance with an embodiment of the present invention.

FIG. 2 shows a high level block diagram of an exemplary wirelessly-enabled device 18 (wireless device) of a type that can be used to facilitate tracking of an object 14 in accordance with an embodiment of the present invention. The wireless device 18 includes memory 26, a wireless data radio 28, and a processor 30 that is configured to control the overall operation of the device 18 via a data bus 32. The wireless device 18 also includes a power supply (or battery) 34, which is used for providing power to the wireless device while it remains physically associated with the object 14.

As shown, the memory 26 includes a unique device identifier 20 that is used for uniquely identifying the wireless device 18. The unique device identifier 20 can, in turn, be used to uniquely identify the object 14, which the wireless device 18 has been physically associated with. In one embodiment, the device identifier 20 is a MAC address that uniquely identifies the wireless device 18, and the wireless data radio 28 is a Bluetooth-enabled wireless data radio configured to transmit a signal that includes the unique device identifier 20. As indicated above, the transmission of the unique device identifier 20 by the wireless device 18 can be received by any wireless access point 22 that is within transmission range of the device 18 and is configured to listen for it.

The memory 26 also includes a set of firmware 36 that instructs the processor 30 how to control the basic operation of the wirelessly-enabled device 18. As is well known by those of ordinary skill in the art, "firmware" is basically software routines that are stored in read-only memory, which, unlike random access memory (RAM), stays intact even in the absence of electrical power. In one embodiment, the firmware 36 includes instructions that direct the processor 30 to cause the unique device identifier 20 to be transmitted via the wireless data radio 28 at predetermined intervals. In one embodiment, the firmware 36 also instructs the processor 30 to power down the device 18 in between transmissions of the unique device identifier 20. In this way, the wirelessly-enabled device 18 can be programmed to operate in a manner that causes it to "wake up" only during transmissions of the device identifier 20. This, in turn, allows the battery 34 to have a substantially longer life than would otherwise be possible if the wirelessly-enabled device 18 was powered-up continuously. In one embodiment, the wirelessly-enabled device 18 is programmed to "wake up" and transmit the unique device identifier 20 approximately every one-hundred and seventy-five milliseconds.

Figure 3:
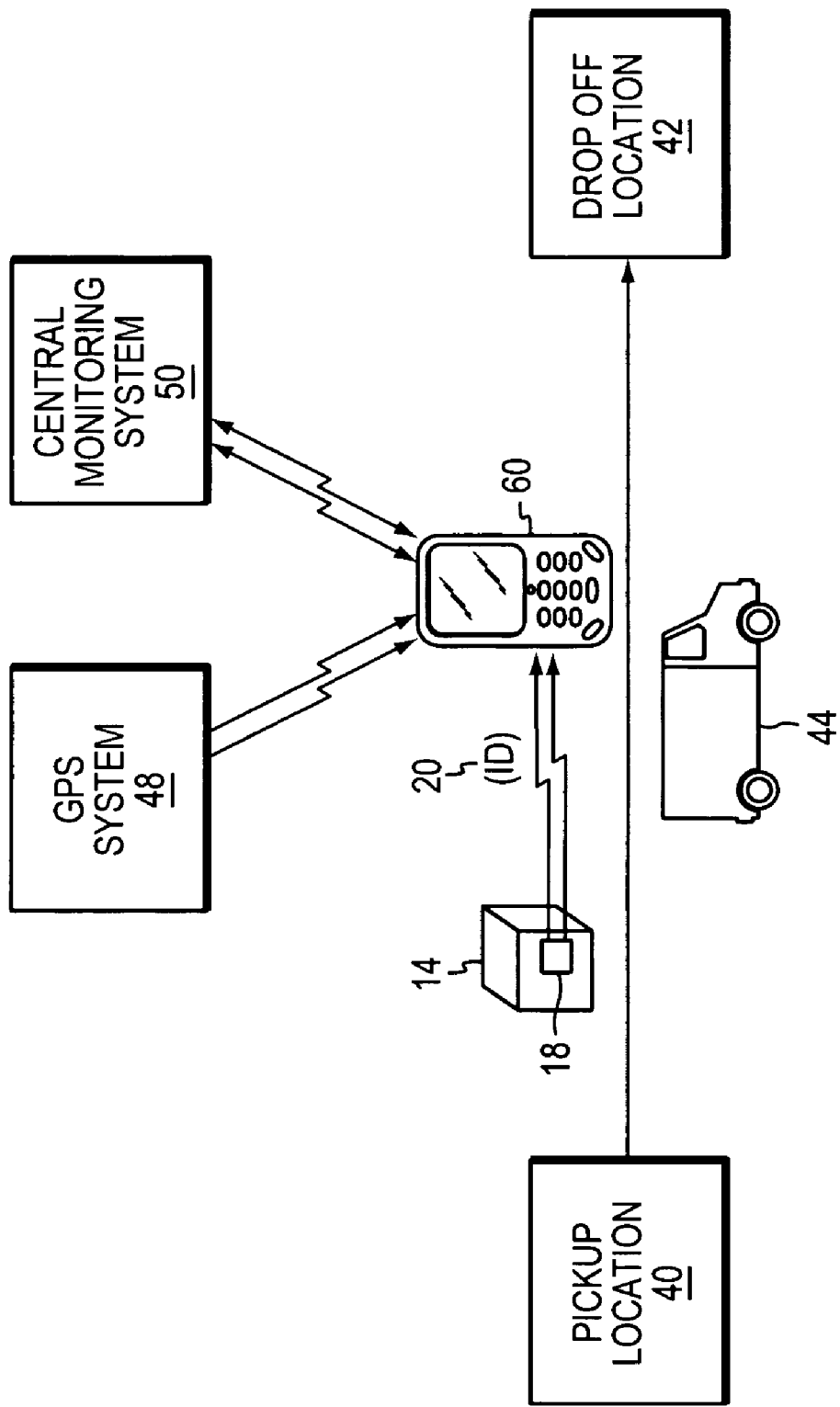
FIG. 3 illustrates how the wirelessly-enabled tracking and visibility system can be used to track the movement of an item during transit in accordance with an embodiment of the present invention.

FIG. 3 illustrates how the wirelessly-enabled tracking and visibility system 10 can be used to track the movement of an object 14 during transit in accordance with one embodiment of the present invention. In this illustration, the object 14 is being transported from a pickup location 40 to a drop off location 42 via a delivery vehicle 44.

Physically associated with the object 14 is a wireless device 18 that is configured to periodically transmit a unique device identifier 20 at predetermined intervals. The transmission of the unique device identifier 20 by the wireless device 18 can be detected by any wireless access point 22 that is within range of the transmission and configured to listen for it. However, unlike in the embodiment of FIG. 1, there may not be any fixed wireless access points 22 located along the delivery route between the pickup and the drop off locations that are configured to receive and process the signal being transmitted by the wireless device 18. Instead, in one embodiment, a mobile access device 60 is equipped with an appropriate wireless data radio that is configured to receive the unique device identifier 20 from the wireless device 18. The mobile access device 60 can be any device (or system) that is generally moving with the object 14 as it is transported form the pickup location 40 to the drop off location 42.

Thus, in effect, the mobile access device 60 can be used in place of, or in addition to, the fixed wireless access points 22, which were generally described above in regard to FIG. 1. In one embodiment, both the wireless device 18 that is physically associated with the object 14, and the mobile access device 60 are configured to communicate with each other using at least one of a Bluetooth-compatible, a WiFi-compatible, and a WiMAX-compatible wireless protocol. As indicated above, the term "mobile access device" broadly refers to any type of non-fixed wireless access point, device or system that is generally moving with the object 14 from a first location to a second location, and is capable of receiving and processing transmissions or messages from the wireless device 18. The transmissions or messages received from the wireless device 18 typically include, but are not limited to, a device identifier 20 for uniquely identifying the particular wireless device 18 and, accordingly, the object 14 which the device is physically associated with.

In one embodiment, the mobile access device 60 can be part of a vehicle monitoring system that includes a Bluetooth-enabled wireless access point mounted somewhere on or in the vehicle 44. For example, the access point (or device) 60 can be positioned near a cargo door where objects are taken onto and off of the vehicle. In another embodiment, a Bluetooth-enabled cell phone or any other such device (e.g., PDA, laptop computer, etc.) may be configured to receive the transmissions emitted by the wireless device 18. In yet another embodiment, the mobile access device 60 can be a properly equipped portable delivery information acquisition device of a type typically carried and used by delivery personnel, such as the "DIAD" (Delivery Information Acquisition Device) used by package delivery drivers at UPS™. As is known in the art, such devices may also operate as scanning devices for scanning a label associated with the object at or near the point of delivery. As such, in one embodiment, a single device 60 (as shown in FIG. 3) can be used to generate multiple types of tracking data for the same object (e.g., one type based on the scanning of a label associated with the object, the other type based in part on processing transmissions received from the wireless device 18).

Receipt of the unique device identifier 20 by the mobile access device 60 can be used to trigger a sequence of tracking and visibility steps that are performed in relation to the object 14. For example, the mobile access device 60 can be configured to generate timestamp data upon receipt of the unique device identifier 20. In another embodiment, timestamp data may already be included in the signal transmitted by the wireless device 18. In this way, the time and date at which such transmission was received can be recorded in association with the unique device identifier 20. Furthermore, location data can also be recorded in association with the unique device identifier 20. In the context of a package delivery system, for example, this data can be linked to the item 14's standard tracking number and all other data associated therewith.

In one embodiment, the mobile access device 60 can be configured to receive GPS data from a GPS system 48. By correlating the closest GPS reading(s) to a time at which the unique device identifier 20 was received by the mobile access device 60 from the wirelessly-enabled device 18, a time-date-location data point can be stored in association with the unique device identifier 20. Over time, a history of such data points can be used to provide a running trace of where the object 14 has been, and when. As shown, in one embodiment, this information can be transmitted via a wireless link in real time (or near real-time) to the central monitoring system 50, which, in turn, can provide such data in near real-time to one or more authorized persons or related systems.

Figure 4:
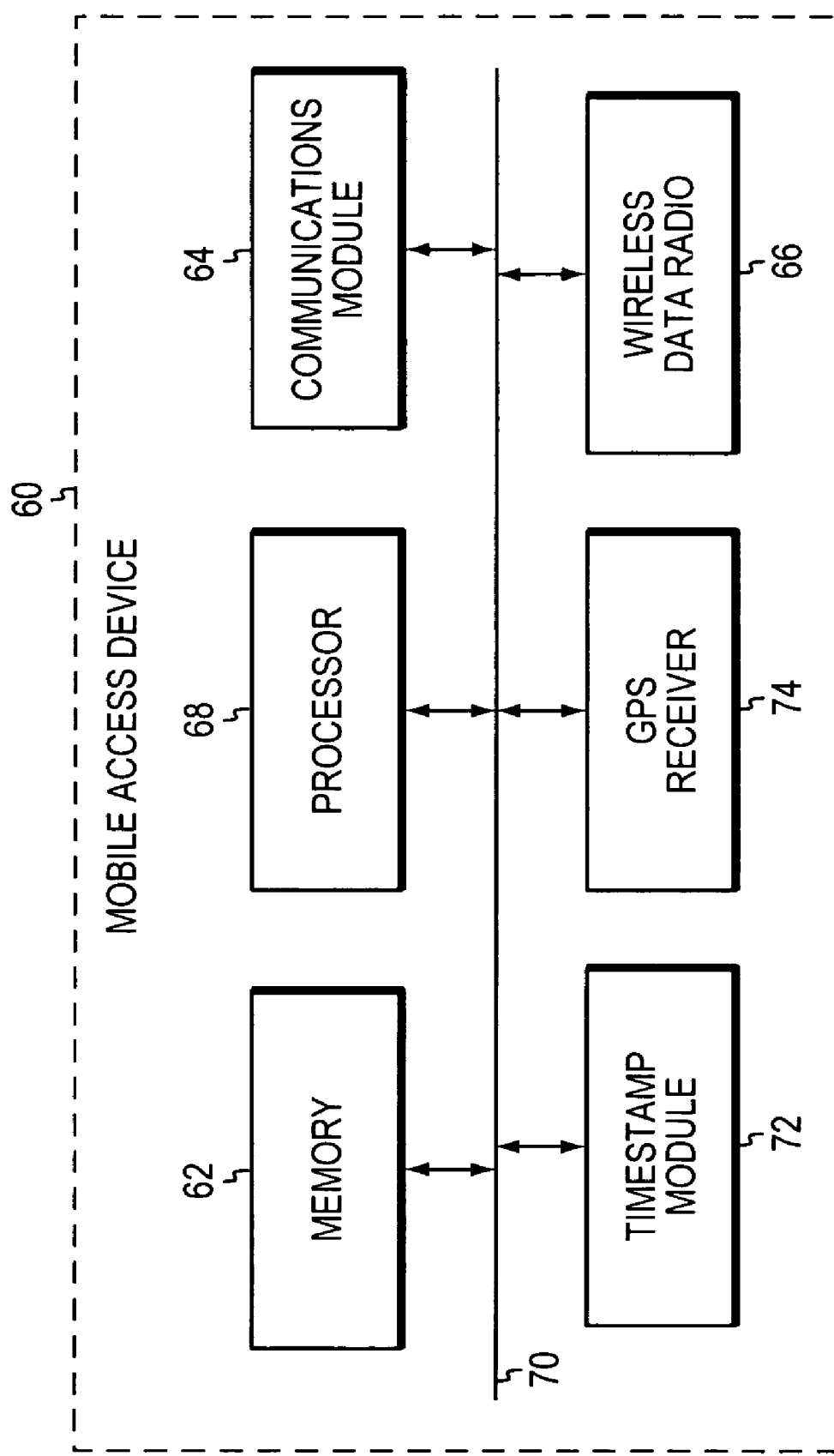
FIG. 4 shows a high level block diagram of an exemplary mobile access device of a type that can be used to facilitate the tracking of an item during transit in accordance with an embodiment of the present invention.

FIG. 4 shows a high level block diagram of an exemplary mobile access device 60 of a type that can be used to facilitate the tracking of an object 14 during transit in accordance with one embodiment of the present invention. The mobile access device 60 includes memory 62, a communications module 64, a wireless data radio 66, and a processor 68 that is configured to control the overall operation of the device 60 via a data bus 70. As described above, the wireless data radio 56 can be used to receive messages transmitted from wirelessly-enabled devices 18 associated with corresponding items 14. In a preferred embodiment, the wireless data radio 56 is a Bluetooth-enabled data radio.

The mobile access device 60 also includes a timestamp module 72 and a GPS receiver 74. The timestamp module 72 can be used for generating time and date information in association with each transmission that is received from the wireless device 18. The GPS receiver 74 can be used for correlating location data with each such transmission. As described above, by correlating the closest GPS reading(s) to the time at which the unique device identifier 20 was received from the wireless device 18, a time-date-location data point can be stored in association with the unique device identifier 20. Over time, these data points can provide a running trace of where the particular item 14 has been, and when. In one embodiment, this data can be transmitted wirelessly (in real-time) to a central monitoring system 50, via the communication module 64, for storage in a central database 54.

FIG. 5 shows a process flow diagram that illustrates the steps for using a wireless device 18 to facilitate the tracking of an object 14 in accordance with one embodiment of the present invention. At Step 101, a wireless device 18 is programmed to periodically transmit an identifier 20 that uniquely identifies the device. In one embodiment, the device 18 is at least one of a Bluetooth-enabled, a WiFi-enabled, and a WiMAX-enabled wireless device, and the device identifier 20 is a MAC address that uniquely identifies that particular device. As indicated above, the transmission of the unique device identifier 20 by the wireless device 18 can be received by any wireless access point 22 that is within transmission range of the device and configured to listen for it.

The process then proceeds to Step 102 where the unique device identifier 20 is stored in association with a tracking number that is to be used to track the object 14 using yet another tracking system. In one embodiment, the tracking number associated with the object 14 is of a type that would normally be provided by a common carrier, such as UPS. The process of associating the device identifier 20 with the object 14's tracking number can be carried out, for example, by using a scanner to scan a first barcode found on a standard shipping label associated with the object 14, and to scan a second barcode found on the wireless device 18, the first barcode having been previously encoded with the tracking number and the second with the device identifier. In one embodiment, this information can be fed into an online shipping system such as UPS.com, for example, which handles the logistics of storing the unique device identifier 20 in association with the tracking number of the object 14. At Step 103, the wireless device 18 is physically associated with the object 14. This can be done, for example, by inserting the device 18 into the object 14 prior to shipment.

In one embodiment, while the object 14 is being moved from place to place within the carrier's logistics network, the wireless device 18 is periodically transmitting the unique device identifier 20 at predetermined intervals. Thus, as indicated in Step 104, when the device 18 is brought within range of a wireless access point 22, 60 (which can include a "mobile" or "fixed" wireless access point, as described above), the unique device identifier 20 will be received by such access point. At Step 105, timestamp and location data is generated in response to the receipt of the device identifier 20 at the access point 22, 60. The timestamp data and location data can then be stored (Step 106) in a central database 54 in association with at least one of the unique device identifier 20 and the tacking number associated with the object 14. Over time, a history of such data points provides a running trace of where the object 14 has been, and when.

FIG. 6 shows a process flow diagram that illustrates the steps for using a wireless device 18 to facilitate the tracking of an object 14 in accordance with another embodiment of the present invention. To facilitate the monitoring of the object 14 as it moves through a carrier's logistics network, a wireless device 18 (at Step 201) is physically associated with the object. This can be done, for example, by inserting the wireless device 18 into the object 14 prior to shipment. In one embodiment, the wireless device 18 is programmed to periodically transmit a signal that includes, but is not limited to, a device identifier 20 which can be used for uniquely identifying the device. At Step 202, the device identifier 20 is associated with a separate tracking number that is used for uniquely identifying the object 14 within the carrier's logistics network. In one embodiment, this generally includes storing the device identifier 20 in association with the tracking number in a central database 54.

At Step 203, a first type of tracking data is generated by scanning a label associated with the object 14. These scanning operations can occur at a plurality of scan points located throughout the carrier's logistics network. As described above, some of these scanning operations may involve a "physical" scanning of a label affixed directly to the object, while others may involve only a "logical" scan of a label associated with a lager container within which the object is believed to be traveling along with numerous other objects destined for a common delivery point.

As the object 14 is transported through the carrier's logistics network, the signal being transmitted by wireless device 18 can be received (at Step 204) by one or more wireless access points 22, 60. Each time a wireless access point 22, 60 receives such a transmission, a second type of tracking data can be generated (Step 205). As described above, this second type of tracking data, which can be used to independently verify the location of the object 14 at a time when the signal is received, is based at least in part on the location of the wireless access point at the time the signal is received from the wireless device 18. At Step 206, the first type of tracking data and the second type of tracking data can be stored in a central database 54 in association with at least one of the device identifier and the tracking number.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are That which is claimed:

1. A system for providing two types of tracking for monitoring objects moving through a carrier's logistics network, said system comprising:
a plurality of scanning devices at a fixed location within said carrier's logistics network for generating a first type of tracking data indicating that an object is at the fixed location by scanning a container label associated with the object, wherein the container label is affixed to a container used for holding a plurality of objects destined for (a) a common location within said carrier's logistics network and (b) a plurality of delivery locations;
a wireless device physically associated with said object, said wireless device configured to transmit a signal comprising a device identifier for uniquely identifying said wireless device;
a plurality of wireless access points at the fixed location within said carrier's logistics network for (a) receiving said signal from said wireless device and (b) generating a second type of tracking data indicating (i) that the object is at the fixed location within said carrier's logistics network and (ii) a time said signal is received;
a database for storing data associated with the movement of said object through said carrier's logistics network; and
a central processing unit in communication with said plurality of scanning devices, said plurality of wireless access points, and said database, said central processing unit configured to:
receive said first type of tracking data from said plurality of scanning devices indicating that the object is at the fixed location within said carrier's logistics network;
receive said second type of tracking data from said plurality of wireless access points indicating that the object is at the fixed location within said carrier's logistics network; and
store said first type of tracking data and said second type of tracking data in said database in association with at least one of said device identifier and a tracking number to provide two types of tracking.

2. The system of claim 1, wherein the wireless device is concealed from view within the object.

3. The system of claim 1, wherein the object is a package.

4. The system of claim 1, wherein said central processing unit is configured to store said device identifier in association with said tracking number in said database prior to shipping said object.

5. The system of claim 1, wherein said container label includes at least one of a barcode and a radio-frequency identification (RFID) tag for storing said tracking number.

6. The system of claim 1, wherein the wireless device is configured to transmit said signal using at least one of a Bluetooth-compatible, a WiFi-compatible, and a WiMAX-compatible wireless protocol.

7. The system of claim 1, wherein the device identifier transmitted via said signal is a media access control (MAC) address unique to said wireless device.

8. A method of providing two types of tracking for monitoring objects moving through a carrier's logistics network, said method comprising the steps of:
receiving a tracking number associated with an object, said object (a) being transported through a carrier's logistics network, (b) used for holding an item, and (c) comprising an object label that (i) includes said tracking number and (ii) is affixed to said object;
generating a signal from a wireless device, wherein (a) said signal comprises a device identifier for uniquely identifying said wireless device and (b) said wireless device is physically located within said object;
storing said device identifier in association with said tracking number;
generating a first type of tracking data from a scan of a container label at a fixed location within said carrier's logistics network, wherein the container label is affixed to a container used for holding a plurality of objects destined for (a) a common location within said carrier's logistics network and (b) a plurality of delivery locations;
receiving said signal from said wireless device at a wireless access point positioned at a fixed location within said carrier's logistics network;
in response to receiving said signal from said wireless device at said wireless access point, generating a second type of tracking data, said second type of tracking data indicating (a) that the object is at the fixed location within said carrier's logistics network and (b) a time said signal is received; and
storing said first type of tracking data and said second type of tracking data in association with at least one of said device identifier and said tracking number to provide two types of tracking.

9. The method of claim 8, wherein the object is a package.

10. The method of claim 8, wherein said step of storing said device identifier in association with said tracking number comprises storing said device identifier in association with said tracking number in a database prior to shipping said object.

11. The method of claim 8, wherein said container label includes at least one of a barcode and a radio-frequency identification (RFID) tag.

12. The method of claim 8, wherein the wireless device is configured to transmit said signal using at least one of a Bluetooth-compatible, a WiFi-compatible, and a WiMAX-compatible wireless protocol.

13. The method of claim 8, wherein the device identifier transmitted via said signal is a media access control (MAC) address unique to said wireless device.

* * * * *